United States Patent [19]

Häll

[11] 4,355,441
[45] Oct. 26, 1982

[54] ROPE-LOCK

[76] Inventor: Gunnar B. Häll, Kornvägen 8, S-736 00 Kungsör, Sweden

[21] Appl. No.: 94,913

[22] Filed: Nov. 16, 1979

[30] Foreign Application Priority Data

| Nov. 24, 1978 [SE] | Sweden | 7812117 |
|---|---|---|
| Feb. 15, 1979 [SE] | Sweden | 7901324 |
| Feb. 15, 1979 [SE] | Sweden | 7901327 |
| May 1, 1979 [SE] | Sweden | 7900113 |
| May 1, 1979 [SE] | Sweden | 7900114 |

[51] Int. Cl.³ .............................................. F16G 11/04
[52] U.S. Cl. .............................. 24/134 KB; 188/65.3
[58] Field of Search ...... 24/134 R, 134 KA, 134 KB, 24/134 L; 114/199; 188/65.1, 65.3, 65.4

[56] References Cited

U.S. PATENT DOCUMENTS

| 302,389 | 7/1884 | Ferdinand | 24/134 KB |
|---|---|---|---|
| 467,815 | 1/1892 | Kent | 24/134 L |
| 1,381,311 | 6/1921 | Johnson et al. | 24/134 R |
| 1,449,945 | 3/1923 | Jacobsen | 24/134 L |
| 1,710,697 | 4/1929 | Gilbert | 24/134 KB X |
| 2,057,608 | 10/1936 | Carroll | 24/134 KB |
| 4,071,926 | 2/1978 | Sweet et al. | 24/134 KB X |

FOREIGN PATENT DOCUMENTS 621883 2/1927 France .............................. 24/134 R Primary Examiner—Thomas J. Holko
Attorney, Agent, or Firm—Birch, Stewart, Kolasch & Birch

[57] ABSTRACT

A rope lock intended for preventing a rope (13) inserted therein from being moved in a certain direction therethrough by a pulling force in the rope. The lock is primarily intended for use as a sheet lock or a winch unloading lock on sailing boats. The lock has an abutment (4), an operating member (6) arranged pivotable about a first pin (7) in relation to the abutment and a locking member (10) arranged pivotable about a second pin (11) relative to the abutment. The locking member has a thrust portion (12) which forces the rope towards the abutment with a thrusting force in the active position, but not in the inactive position. The locking member also has a contact portion (14) for generating at least a portion of this thrust force. The lock is taken between active position and inactive position by pivoting the operating member. Said member has an operating position (9) which is eccentric relative to the first pin, and which is adapted for providing a torque about the second pin, at least in the active position, such that the rope is held between the abutment and the thrust portion.

6 Claims, 7 Drawing Figures

ROPE-LOCK

FIELD OF THE INVENTION

The present invention relates to a rope lock intended for preventing a rope passed through the lock from being moved in a certain direction through it by a tensional force in the rope. The lock is primarily intended for ropes regulating sails or unloading a winch on sailing boats, but other uses are conceivable.

DESCRIPTION OF PRIOR ART

A usual type of sheet lock or winch unloader on the market comprises a fixed abutment and a locking member pivotable in relation to the abutment, with an eccentric thrust portion which is disposed for pressing a sheet or halyard against the abutment when in a locking or active position. Another usual type has two pivotable locking members with eccentric thrust portions, which are arranged to hold a sheet or halyard between them in the active position.

Common for both types is that they are formed so that the pull in the rope strives, as a result of friction between the rope and thrust portion of the respective locking member, to pivot the respective members so that the holding force increases with the pull in the rope.

Many known rope locks utilize the pull in the rope for generating the thrust or torque needed for clamping the rope between a fixed abutment and a locking member, pivotable in relation to the abutment. In such cases, the locking member can be formed as a two-legged lever with a thrust portion pressing the rope against the abutment with a certain pressure, and a contact portion against which the rope bears to generate said thrust. The U.S. Pat. Nos. 2,661,514 and 2,998,625 illustrate examples of such rope locks. In these specifications, the thrust portions have the reference denotations A and 26 and the contact portions have the reference denotations 21 and 27, respectively.

It is also known to use two-legged levers in rope locks for other purposes. U.S. Pat. No. 1,710,697 illustrates a rope lock with two two-legged levers having the reference numerals 13 and 15, respectively. One lever (13) has a thrust portion which, together with an abutment (9), holds the rope between them in the locking position. This lever is mounted on a shaft (14) with a position relative to the abutment such that the holding force in the locking position increases with the pull in the rope.

The second lever 15 functions as an operating means for taking the rope lock from the active to the inactive position. This second lever has an operating portion which engages against the contact portion of the first lever when pivoted anti-clockwise, and strives to pivot the first lever clockwise.

Some rope locks have an operating member pivotably arranged relative the abutment, and are taken from their active position to their inactive position by pivoting the operating member. If said member also functions as a locking member and itself forces the rope against the abutment, the lock will often be difficult to open, due to friction between the rope and operating member, if there are large tensional forces in the rope.

Other rope locks are formed such that they are difficult to take from their active or locking position to their inactive position without neutralizing the pull in the rope. The type with two pivotable locking members, mentioned above, is sometimes formed in this way, as well as rope locks according to U.S. Pat. No. 1,710,697. If there are large pulling forces in the rope, it can sometimes be an advantage if the rope lock or winch unloader can be taken to the inactive position without the pull in the rope needing to be neutralized.

SUMMARY OF THE INVENTION

One object of the present invention is to provide a rope lock which is easy to move from the active to the inactive position without neutralizing the pull in the rope, even if the former is great. A second object is to provide a rope lock where the clamping force required for holding the rope is generated at a location in the lock other than that were holding and clamping are performed.

The rope lock in accordance with the present invention has an abutment, an operating member disposed pivotably about a first pin, in relation to the abutment, and a locking member disposed pivotably about a second pin in relation to the abutment. The locking member has a thrust portion which forces the rope against the abutment when in an active position but not in an inactive position. The locking member also has a contact portion for generating at least a portion of this force. The rope lock is taken between the locking position and inactive position by pivoting the operating member. Said member has an operating portion which is eccentric relative to the first pin, said portion being arranged for providing a torque, acting about the second pin on the locking member, at least in the locking position, such that the rope is held between abutment and thrust portion.

In accordance with one embodiment, this torque is provided by the operating portion being disposed for engaging against the contact portion, at least in the locking position. In accordance with another embodiment, this torque is provided by the operating portion being arranged to take the rope into engagement against the contact portion, at least in the locking position. In accordance with a third embodiment, said torque is obtained by the operating portion being arranged for clamping the rope between it and the abutment portion, at least in the locking position.

In accordance with a specially advantageous embodiment, the distance of the engagement or contact portion from the pivoting centre of the locking member is greater than the distance of the thrust portion from said centre. The distance between the contact portion and thrust portion is then preferably greater than the distance between the contact portion and the pivoting centre of the locking member.

BRIEF DESCRIPTION OF THE DRAWINGS

The invention will now be explained and described in conjunction with some embodiments illustrated on the drawings.

PREFERRED EMBODIMENT

Figure 1:
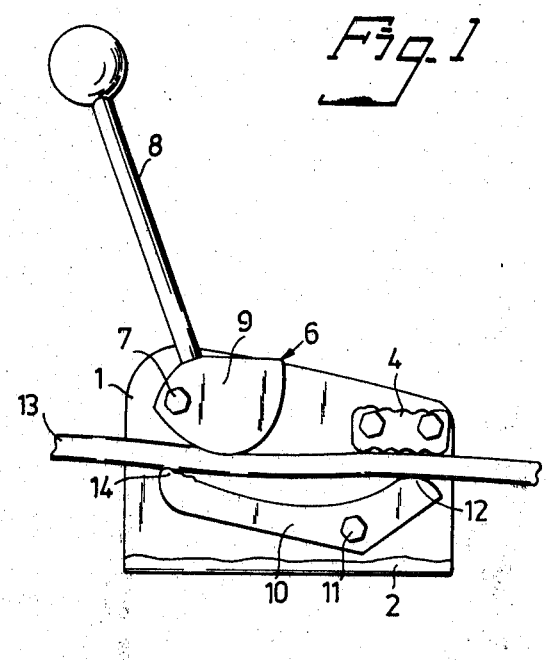
FIGS. 1, 2 and 3 illustrate a first embodiment of a rope lock seen from one side in the inactive position, from the active or locking position and from the front in the active position, respectively. In order to show interesting details, one side wall is cut away in FIGS. 1 and 2.
Figure 3:
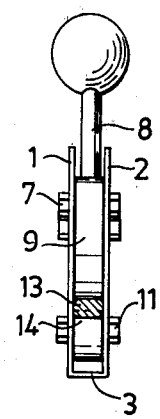

The rope lock illustrated in FIGS. 1 and 3 has a substantially U-shaped frame, with two plate-like walls 1 and 2 having the same configuration, and a plate-like bottom. The bottom is disposed for attaching to the deck of a boat, for example, in a way not shown. An abutment 4 is fixed between the walls at their upper rear portion. The frame and abutment can be made from aluminium or stainless steel.

An operating member 6 is pivotably mounted on a first pin 7 through the upper forward portion of the sides. The operating member has a handle portion 8 and an operating portion 9.

A substantially plate-like locking member 10 is pivotably mounted on a second pin 11 through the sides, somewhat in front of, and below the abutment. Said member is elongate, and at one end it has a thrust portion 12 arranged to force a rope 13 passed through the lock towards the abutment when in the locking position, but not in the inactive position. The other end of the locking member is provided with a contact portion 14. The contact portion and thrust portion are substantially on opposite sides of the second pin, and the distance of the contact portion from the second pin is about three times as great as the distance of the thrust portion from said second pin.

When the rope lock is inactive, as in FIG. 1, the handle portion of the operating member extends forward, i.e. from the operating portion in a direction away from the abutment. The thrust portion of the locking member is simultaneously comparatively far away from the abutment. A rope passed through the rope lock can therefore be moved forwards or backwards according as the pull in the rope, without significant resistance.

Figure 2:
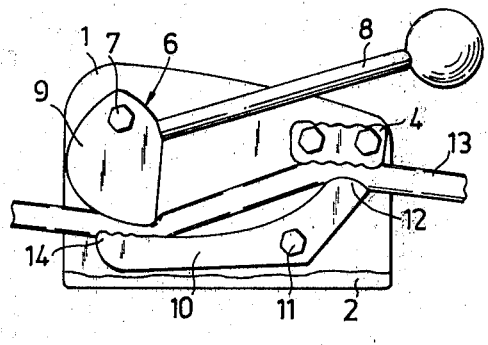

When the rope lock is in the locking position, as in FIGS. 2 and 3, the handle portion of the operating member extends backwards, i.e. from the operating portion in a direction towards and past the abutment. The thrust portion of the locking member is simultaneously comparatively close to the abutment, and forces a rope passing through the rope lock into engagement against the abutment. On the surface facing towards the rope and thrust portion, the abutment has been provided with suitable friction by toothing or in some other way. The rope passing through the lock can therefore not be moved forward therethrough by a forward pull in the rope without considerable resistance.

To ensure that the thrust portion forces the rope against the abutment with a compressive force, the operating portion is formed and oriented relative to the first pin, second pin and contact portion such that the operating portion bears on the contact portion via the rope in the active position, but not in the inactive position. The thrust is so great that the rope is heavily clamped between the operating portion and the contact portion. The operating portion may be made from aluminum and have a smooth surface towards the rope so that there is low friction between it and the rope when taking the rope lock from the active to the inactive position.

Figure 4:
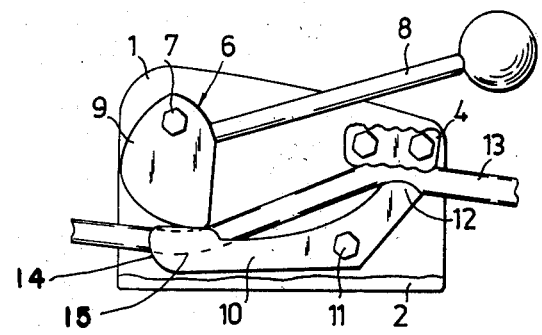
FIG. 4 illustrates a second embodiment with a cutaway side wall seen from one side in the active position.

FIG. 4 illustrates an embodiment which principally differs from the one shown in FIGS. 1-3 by there being a groove 15 in the contact portion 14 of the operating member. The depth, width and orientation of the groove are such that in the locking position the operating portion engages directly against the contact portion itself instead of against the rope as in FIG. 2.

Figure 5:
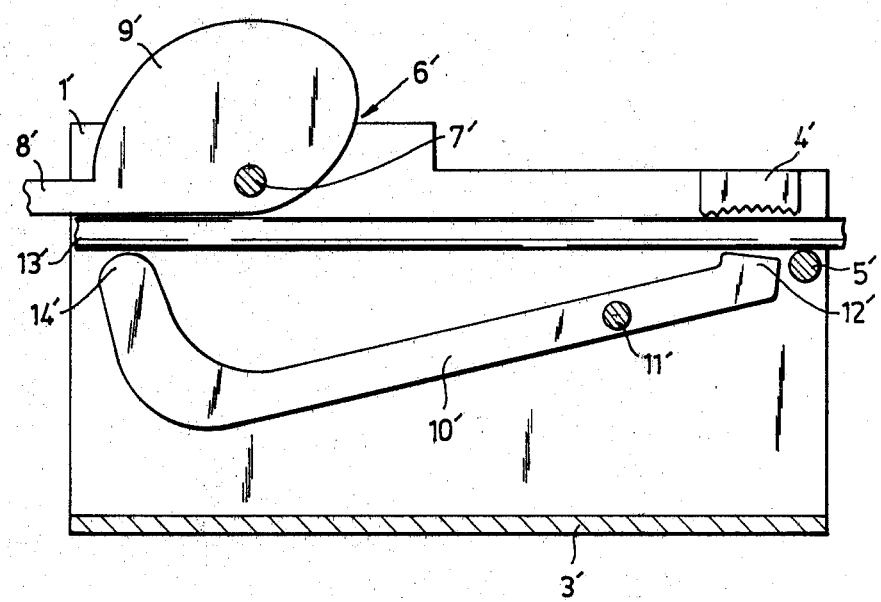
FIGS. 5-7 illustrate a third embodiment seen from one side in the inactive position, locking position and from the front in the locking position, respectively. In order to illustrate interesting details, one side wall is cut away in FIGS. 5 and 6, similarly to FIGS. 1 and 2.
Figure 6:
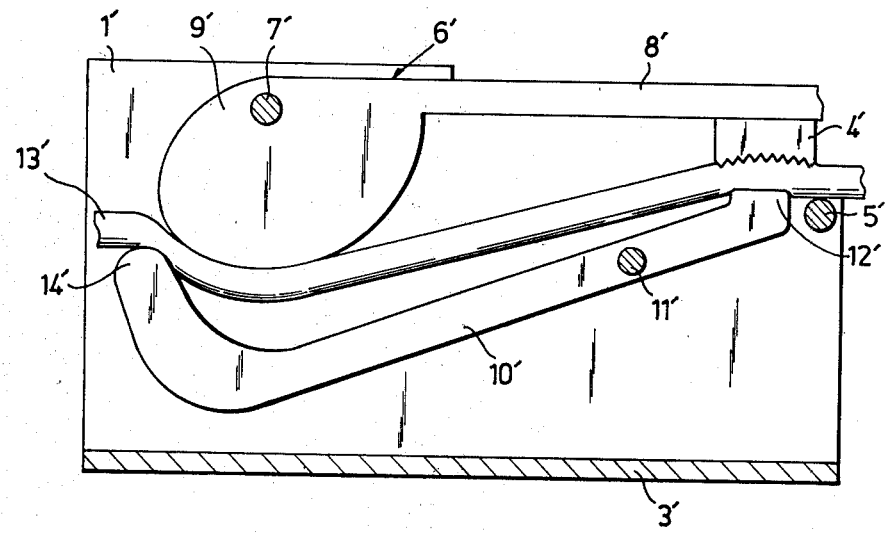
Figure 7:
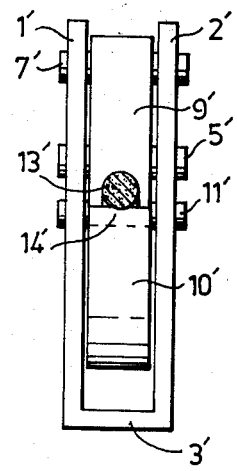

FIGS. 5-7 illustrate an embodiment where the locking member and operating member not only depart somewhat from those illustrated in FIGS. 1-4 in form, but also in their construction. Apart from a guiding means in the form of a pin 5' between and through the walls, this embodiment has an abutment, an operating member and a locking member corresponding to those in FIGS. 1-4. Corresponding details have therefore been given reference numerals distinguished from those in FIGS. 1-4 by a prime sign.

The embodiment illustrated in FIGS. 5-7 has relative spacings between the first pin, second pin, contact portion and operating portion; and configuration of the operating portion and locking member such that the thrust portion forces the rope towards the abutment with a force, the size of which increases with a pulling force to the left in the rope. For this object the operating portion is disposed to move the rope into engagement against the contact portion of the locking member in the active position, but not in the inactive position. This is provided by the operating portion pressing down a portion of the rope under the contact portion and also clamping the rope between itself and the contact portion.

The resulting force with which the rope engages against the contact portion in the active position depends in size and direction on the force with which the operating portion presses the rope against the contact portion, as well as the pull in the rope and the change of direction the rope is subjected to during its engagement against the contact portion. This resulting force exercises an anticlockwise torque about the second pin of the locking member. This torque is balanced by a clockwise torque from the force with which the rope between the abutment and thrust portion engages against the thrust portion. Since the distance of the contact portion to the turning centre of the locking member is three times as great as the distance of the thrust portion to said centre, and changes of directions of the kind mentioned of at least 45° can be achieved, the rope lock can be formed so that said thrust is several times as great as the pull in the rope.

The configuration of the operating portion and position of its turning centre relative to the turning centre and contact portion of the locking members are, inter alia, decisive for the change of direction to which the rope is subjected in its passage past the contact portion. The configuration of the operating portion is also of substantial importance for the force required to pivot the operating member from inactive to active position and vice versa.

By suitable configuration of the bottommost and lower rear portion of the operating portion in the active position, is achieved that the pulling force in the rope initially counteracts pivoting from active to inactive position.

It is not necessary, as in FIGS. 5-7, for the operating portion to clamp the rope between itself and the contact portion in the active position. In certain cases it can be sufficient for the operating portion to push a portion of the rope sufficiently far down towards the bottom and sufficiently far below the contact portion and thrust portion.

The invention is not limited to the described embodiments, and a plurality of modifications of these are possible within the scope thereof. For example, the mutual spacing of the contact portion and thrust portion and the distance to the second pin does not need to have the shown or described proportions. The main thing is that the contact portion is at a considerably greater distance from the second pin than the thrust portion. The turning centre of the locking member does not necessarily need to be under the rope in the inactive position, but can be above the rope in the inactive position, if some other mounting or configuration of the locking member is utilized.

In the embodiments shown in the Figures, it is preferred that the thrust portion has a surface facing towards the rope which is smooth, or formed in some other way such that it has low friction against the rope. It is moreover preferred that the abutment has a surface facing towards the rope which has crenellations or teeth or is formed in some other way so that it has high friction against the rope.

The dimensions of the inventive rope lock are naturally dependent on what rope it is intended for. In the embodiments according to FIGS. 1–7, the distance between the walls 1 and 2 and the thickness of the operating portion, locking member and abutment should naturally be at least as great as the diameter of the thickest rope they are intended for. Certain ropes used as sheets and halyards in sailing boats can be compressed considerably during clamping. The distance between the first and second pins, between the thrust portions and abutment and the form of the operating portion must therefore be suited to the compressability of the rope or ropes for which the rope lock is intended. Since the operating portion in the embodiment according to FIG. 4 presses directly on to the contact portion, this embodiment requires less eccentricity in the operating portion than the embodiment according to FIGS. 1–3 for the same type of rope. With the same eccentricity, this embodiment would therefore take care of greater variations in the compressability of the rope, or a greater range of dimensions for the rope than the embodiment according to FIGS. 1–3. The embodiment according to FIGS. 1–3 has, however, the advantage that the rope clamped between the operating portion and contact portion functions as a brake against unintentional activations of the sheet lock by anti-clockwise pivoting of the operating member resulting from jerks or heavy pulling force variations in the rope.

By making it reversible, the abutment 4 can also be adjusted in a simple way to different dimensions of rope. In this case, the abutment is formed so that two opposing faces are provided with the friction—increasing means described above, the holes for attaching the abutment between walls 1 and 2 being situated such that they are closer to one face than they are to the other, as will be seen from the drawings. Depending on what face of the abutment is turned towards the thrust portion of the locking member, the rope lock can be used for ropes having somewhat different dimensions.

What I claim is:

1. A rope lock for selectively securing a rope having a tensile force applied thereto comprising:
   an abutment;
   a locking member pivotal about a locking member pin and having a thrust portion on a first end for clamping said rope against said abutment in a locking position, said locking member further having a contact portion on a second end thereof; and
   an eccentric cam pivotal about a cam pivot pin and including an operating portion for selectively applying a latching force against said contact portion of said locking member;
   the latching force selectively applied to said locking member by said operating portion of said eccentric cam producing a torque on said locking member to thereby clamp said rope between said abutment and said thrust portion of said locking member in said locking position;
   said operating portion of said eccentric cam being selectively adapted, at least in said locking position, to operatively secure said rope between said operating portion and said contact portion.

2. The rope lock of claim 1 wherein said operating portion of said eccentric cam contacts said contact portion of said locking member to apply said latching force to said contact portion.

3. The rope lock of claim 1 wherein said operating portion of said eccentric cam contacts said rope which in turn contacts said contact portion of said locking member to apply said latching force to said contact portion.

4. The rope lock of claim 3 wherein said rope is clamped between said operating portion of said eccentric cam and said contact portion of said locking member.

5. The rope lock of claim 1, 2, 3 or 4, wherein the distance between said contact portion of said locking member and said locking member pin is greater than the distance between said thrust portion of said locking member and said locking member pin.

6. The rope lock of claim 5 wherein the distance between said contact portion and said thrust portion of said locking member is greater than the distance between said contact portion of said locking member and said locking member pin.

* * * * *

UNITED STATES PATENT AND TRADEMARK OFFICE
CERTIFICATE OF CORRECTION

PATENT NO. : 4,355,441
DATED : October 26, 1982
INVENTOR(S) : Gunnar Bernhard Hall It is certified that error appears in the above—identified patent and that said Letters Patent is hereby corrected as shown below:

In the Heading of the patent, under the category "[30] Foreign Application Priority Data"

```
change   "Nov. 24, 1978  [SE]  Sweden...............7812117
          Feb. 15, 1979  [SE]  Sweden...............7901324
          Feb. 15, 1979  [SE]  Sweden...............7901327
          May   1, 1979  [SE]  Sweden...............7900113
          May   1, 1979  [SE]  Sweden...............7900114"

to     -- Nov. 24, 1978  [SE]  Sweden...............7812117
          Feb. 15, 1979  [SE]  Sweden...............7901324
          Feb. 15, 1979  [SE]  Sweden...............7901327
          Jan.  5, 1979  [SE]  Sweden...............7900113
          Jan.  5, 1979  [SE]  Sweden...............7900114    --
```

Signed and Sealed this

Eleventh Day of October 1983

[SEAL]

Attest:

GERALD J. MOSSINGHOFF

*Attesting Officer*     *Commissioner of Patents and Trademarks*